United States Patent
Choi et al.

(10) Patent No.: US 10,745,528 B2
(45) Date of Patent: Aug. 18, 2020

(54) METHOD FOR PRODUCING METAL NANOPARTICLE-POLYMER COMPOSITE THIN FILM

(71) Applicant: The Industry & Academic Cooperation in Chungnam National University (IAC), Daejeon (KR)

(72) Inventors: Ho-Suk Choi, Daejeon (KR); Quoc Chinh Tran, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 0 days.

(21) Appl. No.: 16/219,098

(22) Filed: Dec. 13, 2018

(65) Prior Publication Data

US 2019/0127534 A1 May 2, 2019

Related U.S. Application Data

(63) Continuation of application No. PCT/KR2017/000010, filed on Jan. 2, 2017.

(30) Foreign Application Priority Data

Jun. 14, 2016 (KR) .......................... 10-2016-0073741

(51) Int. Cl.
*C08J 3/205* (2006.01)
*C08K 3/08* (2006.01)
(Continued)

(52) U.S. Cl.
CPC ............. *C08J 3/205* (2013.01); *B22F 1/0018* (2013.01); *B22F 1/0062* (2013.01); *C08J 3/28* (2013.01);
(Continued)

(58) Field of Classification Search
CPC ....... C08J 3/205; C08J 3/28; C08J 5/18; C08J 2371/02; C08J 5/005; C08K 3/02; C08K 2003/0831; C08K 2201/005; C08K 3/08; B22F 2009/245; B22F 1/0018; B22F 1/0062; B22F 1/0022
See application file for complete search history.

(56) References Cited

U.S. PATENT DOCUMENTS

2014/0227548 A1* 8/2014 Myrick ..................... C10L 1/28
428/570

FOREIGN PATENT DOCUMENTS

| KR | 10-2013-0063718 A | 6/2013 |
|----|-------------------|--------|
| KR | 10-1479788 B1     | 1/2015 |
| KR | 10-2016-0054058 A | 5/2016 |

* cited by examiner

*Primary Examiner* — Jessica M Roswell
(74) *Attorney, Agent, or Firm* — Nelson Mullins Riley & Scarborough LLP; Kongsik Kim, Esq.

(57) ABSTRACT

The present invention relates to a method for producing a metal nanoparticle-polymer composite thin film comprising uniformly shaped metal nanoparticles uniformly dispersed in a polymer matrix, and more particularly to a method for producing a gold nanoparticle-polymer composite thin film, comprising the steps of: (A) preparing a mixture of an ionic liquid and polyethylene oxide; (B) preparing a reaction solution by dissolving a gold nanoparticle precursor in the mixture; (C) producing a gold nanoparticle-polymer composite by applying plasma to the interface of the reaction solution; and (D) separating the gold nanoparticle-polymer composite from the reaction solution.

12 Claims, 9 Drawing Sheets

(51) Int. Cl.
*B22F 1/00* (2006.01)
*C08J 3/28* (2006.01)
*C08J 5/18* (2006.01)
*C08K 3/02* (2006.01)
*B22F 9/24* (2006.01)

(52) U.S. Cl.
CPC ............... *C08J 5/18* (2013.01); *C08K 3/02* (2013.01); *C08K 3/08* (2013.01); *B22F 2009/245* (2013.01); *C08J 2371/02* (2013.01); *C08K 2003/0831* (2013.01); *C08K 2201/005* (2013.01)

METHOD FOR PRODUCING METAL NANOPARTICLE-POLYMER COMPOSITE THIN FILM

CROSS-REFERENCE TO RELATED APPLICATION

This is a continuation of International Application No. PCT/KR2017/000010, with an international filing date of Jan. 2, 2017, which claims the benefit of Korean Application No. 10-2016-0073741 filed on Jun. 14, 2016, the entire contents of which applications are incorporated herein by reference.

TECHNICAL FIELD

The present invention relates to a method for producing a metal nanoparticle-polymer composite thin film comprising uniformly shaped metal nanoparticles uniformly dispersed in a polymer matrix.

BACKGROUND ART

Metal nanoparticle-polymer composites comprising metal nanoparticles dispersed in a polymer matrix are new functional materials which are produced by combining metal nanoparticles with a polymer, which have different physical and chemical properties. Since these metal nanoparticle-polymer composites combine the advantages of the metal nanoparticles and the polymer and can be applied to a wide range of fields, they have received a lot of attention. For example, gold nanoparticles themselves have been applied in various fields, such as surface plasmon resonances, catalysts, nanomedicines, and bio-sensing. Gold nanoparticle-polymer composites comprising gold nanoparticles either adsorbed on the surface of a polymer or contained in a polymer matrix have been reported to have increased activity compared to gold nanoparticles themselves. In addition, with the rapid development of electric, electronic and energy technologies, the need for new materials having excellent functions has been emerged, and studies on metal nanoparticle-polymer composites have also been accelerated.

Conventional methods for producing metal nanoparticle-polymer composites may broadly be classified into an ex-situ method and an in-situ method.

The ex-situ method is a method of producing a composite by mixing previously prepared metal nanoparticles with a polymer as disclosed in Korean Patent No. 10-1519749. In this case, the polymer matrix simply acts as a dispersing agent. This ex-situ method has problems in that an additional process for preparing nanoparticles is required and the agglomeration and precipitation of metal nanoparticles occur during mixing of these metal nanoparticles with the polymer which is a highly viscous liquid. Furthermore, once the nanoparticles are agglomerated, the agglomerated nanoparticles are not easy to disperse uniformly even when an external force is applied thereto.

Meanwhile, the in-situ method is a method of forming metal nanoparticles by reducing a metal nanoparticle precursor on a polymer (or polymer solution) matrix by a physical or chemical method. This class includes: Korean Patent No. 10-1295671 which discloses reducing an organic metal compound, mixed with a polymer matrix, into metal nanoparticles by heat treatment; Japanese Patent No. 0415884 which discloses producing metal nanoparticles by hydrolyzing a metal alkoxide adsorbed on the surface of a polymer; and Korean Patent No. 10-0811001 which discloses depositing a gaseous metal component on the surface of a polymer by plasma discharge in vacuum. The metal nanoparticle-polymer composite produced by the in-situ method has an advantage in that the metal nanoparticles are uniformly dispersed without being agglomerated. However, high-temperature heat treatment is required in the process of reducing a metal nanoparticle precursor, or a system for performing plasma deposition in a high vacuum state is required. When reduction is performed by a physical method, problems arise in that the layer thickness is not uniform and adsorption ability is low. Alternatively, when a metal nanoparticle precursor is reduced by a chemical method, the reduction is performed through a complex chemical reaction process, and hence the production yield is not high and the production cost is inevitably high. In addition, problems arise in that a process for post-treatment of a reagent used as a reducing agent is additionally required and the remaining reagent causes a pollution problem.

It is well known that when metal nanoparticles are applied to fields, such as biosensors or nanomedicines, it is important to control the shape of the metal nanoparticles. However, according to reports that gold nanoparticle-polymer composites were produced by the in-situ method, gold nanoparticles have a spherical shape or an irregular shape, and the shape is not easily controlled. In order to control the shape of the gold nanoparticles included in the composite, various factors, including temperature, a reducing agent, an additive for shape control, and the like, should be changed. For this reason, problems arise in that a process consisting of several steps is required for synthesis and in that an unexpected intermediate is produced which should be removed.

Above all, both the ex-situ and in-situ methods have a problem that polymer production requiring a complicated organic synthesis process must be preceded. Therefore, it is needed to develop a method that can easily control the shape of metal nanoparticles and can produce in a simple manner a metal nanoparticle-polymer composite in which metal nanoparticles are uniformly dispersed without being agglomerated.

The present inventors previously found that a polymer thin film can be produced by applying plasma to the interface between liquid monomers. Based on this finding, the present inventors filed a patent application (Korean Patent Application No. 10-2014-0148118). Through a subsequent study on this finding, the present inventors have found that a metal nanoparticle-polymer composite can be produced in a simple manner by applying the above-described method for producing the polymer thin film, thereby completing the present invention.

SUMMARY

It is an object of the present invention to provide a method capable of producing a gold nanoparticle-polymer composite thin film in a simple manner without requiring either a limited condition, such as a vacuum system, or a separate reagent for reducing a gold nanoparticle precursor.

Another object of the present invention is to provide a method for producing a gold nanoparticle-polymer composite film, in which a production process or a post-treatment process is simple because polymerization and reduction of a gold nanoparticle precursor occur at the same time, and in which agglomeration of gold nanoparticles does not occur and which easily controls the shape and size of gold nanoparticles uniformly dispersed in a polymer matrix.

To achieve the above-described objects, the present invention provides a method for producing a gold nanoparticle-polymer composite thin film, comprising the steps of: (A) preparing a mixture of an ionic liquid and a polyethylene oxide; (B) preparing a reaction solution by dissolving a gold nanoparticle precursor in the mixture; (C) producing a gold nanoparticle-polymer composite by applying plasma to the interface of the reaction solution; and (D) separating the gold nanoparticle-polymer composite from the reaction solution.

Korean Patent Application No. 10-2014-0148118, filed by the present inventors, discloses a method of producing a polymer thin film by gas-liquid interfacial plasma polymerization. The present inventors have found that when a polymer thin film is produced by the above-described method, if a reaction solution contains a metal nanoparticle precursor, reduction to gold nanoparticles occurs during polymerization in a state in which the gold nanoparticle precursor is dispersed in a polymer matrix, and thus a gold nanoparticle-polymer composite thin film is produced, thereby completing the present invention. The ionic liquid and the polyethylene oxide, which are used in the present invention, may be those that can form a thin film by atmospheric-pressure plasma treatment as disclosed in Korean Patent Application No. 10-2014-0148118.

Specifically, the ionic liquid that is used in the present invention is preferably a salt composed of a cation, which is substituted or unsubstituted 1-R-1-methylpyrrolidium or substituted or unsubstituted 1-R-3-methylimidazolium, wherein R is a C3 to C16 alkyl group, and an anion which is $BF_4^-$, $F^-$, $Cl^-$, $Br^-$ or $I^-$.

The polyethylene oxide (POE) is a polymer of a monomer having an ethylene oxide functional group, and has repeating units of —$(CH_2CH_2O)n$-. The polyethylene oxide that is used in the present invention may be any polyethylene oxide miscible with the ionic liquid, and preferably has a molecular weight of 200 to 2,000. If the molecular weight of the polyethylene oxide is excessively high, the polyethylene oxide will be difficult to mix uniformly with the ionic liquid, because the polyethylene oxide is hard and waxy in nature. Examples of the polyethylene oxide include: POE sorbitan fatty acid esters, such as Tween 80 and Tween 20; POE alkyl phenyl ethers, such as Triton X-100, POE nonyl phenyl ether, and POE tristyrenated phenyl ether; POE alkyl ethers, such as POE lauryl ether, POE stearyl ether, POE oleyl ether, and POE tridecyl ether; and POE alkyl amines, such as POE lauryl amine, POE oleyl amine, and POE stearyl amine.

The optimal mixing ratio between the ionic liquid and the polyethylene oxide varies depending on the kinds of ionic liquid and polyethylene oxide used, and hence it is meaningless to limit the optimal mixing ratio. Any person skilled in the art will easily select the optimal mixing ratio through repeated experimentation. Generally, as the content of the polyethylene oxide increases, the thin film formation rate decreases and the proportion of single bonds in the thin film increases.

The gold nanoparticle precursor that is used in the present invention may be any precursor which can be dissolved in the ionic liquid and which can form gold nanoparticles by reduction. Specifically, the gold nanoparticle precursor may be a conventional precursor which is used in the preparation of gold nanoparticles in a conventional art. More specifically, the gold nanoparticle precursor may be, for example, gold tetrachloride, gold trichloride, potassium tetrachloroaurate, gold hydroxide, or gold sulfate.

The concentration of the gold nanoparticle precursor in the reaction solution is preferably 0.01 to 1000 mM, more preferably 0.1 to 200 mM. The concentration of the gold nanoparticle precursor has an effect on the concentration of gold nanoparticles in the gold nanoparticle-polymer composite thin film. It should be understood that as the concentration of the gold nanoparticle precursor increases, the concentration of gold nanoparticles in the thin film increases. Thus, the concentration of gold nanoparticles in the gold nanoparticle-polymer composite thin film being produced can be controlled by controlling the concentration of the gold nanoparticle precursor. If the concentration of the gold nanoparticle precursor is higher than 1000 mM, agglomeration of the gold nanoparticles may occur.

In the present invention, plasma treatment may be performed at atmospheric pressure. However, it is not excluded to apply plasma in a vacuum or pressurized state. Thus, when the gold nanoparticle-polymer composite is to be produced in a vacuum or pressurized state for any other reason, the gold nanoparticle-polymer composite thin film may be produced by performing plasma treatment in a vacuum or pressurized state.

It should be understood that plasma treatment conditions may also be properly controlled depending on the kinds and concentrations of ionic liquid and gold nanoparticle precursor used. In addition, the thickness of the gold nanoparticle-polymer composite thin film being produced and the concentration and size of gold nanoparticles being produced may be controlled by controlling the power of plasma or the plasma treatment time. The power of plasma may range from 1 to 500 W. If the power is higher than the upper limit of the above range, gold nanoparticle crystals will not uniformly grow, and of the power is excessively low, an excessively large amount of time will be required for the production of the gold nanoparticle-polymer composite thin film. As the plasma treatment time increases and the plasma power increases, the thickness of the gold nanoparticle-polymer composite thin film produced increases, and when a certain thickness is reached, the thickness no longer increases even when the plasma treatment time is further extended. In addition, as the plasma treatment time becomes longer, the size of the nanoparticles increases through growth thereof, and as the plasma treatment time becomes longer, the nanoparticles grow into a clearly defined crystalline shape. It should be understood that the optimal plasma treatment time may vary depending on the strength of power, and hence it is meaningless to limit the plasma treatment time to a certain value.

As a plasma carrier gas, inert gas, such as helium, neon, argon, krypton or xenon, may be used. In addition, a mixture of the carrier gas with oxygen, nitrogen or carbon dioxide may be used.

The thickness of the gold nanoparticle-polymer composite thin film that is produced by the method of the present invention is 0.5 to 10 μm, and the concentration gradient of the gold nanoparticles is present along the section of the thin film.

As described above, according to the present invention, a gold nanoparticle-polymer composite thin film is produced while polymerization and the production of gold nanoparticles are performed at the same time without the need to previously prepare gold nanoparticles or a polymer. In addition, a high level of vacuum is not required, and a gold nanoparticle-polymer composite thin film is produced in a simple manner by applying plasma to the interface of a reaction mixture solution for a short time (within 15 minutes) at room temperature and atmospheric pressure without the need to use a separate reducing agent or capping agent.

Thus, the gold nanoparticle-polymer composite thin film can be produced in an economic manner.

Furthermore, according to the present invention, it is possible to produce a gold nanoparticle-polymer composite thin film in which gold nanoparticles are uniformly dispersed in a polymer matrix without being agglomerated and in which the size and shape of the gold nanoparticles are uniform. In addition, it is easy to control the thickness of the thin film and the size of the gold nanoparticles.

The gold nanoparticle-polymer composite thin film produced by the method of the present invention may be used as an electrode material comprising a conductive polymer or as an electromagnetic wave shielding material, or may be used in various fields, including biosensors.

DETAILED DESCRIPTION

Hereinafter, the present invention will be described in more detail with reference to the accompanying drawings and examples. However, these drawings and examples are only illustrative of the contents and scope of the technical idea of the present invention, and the technical scope of the present invention is not limited or modified thereby. It will be obvious to those skilled in the art that various modifications and alterations are possible based on this illustration without departing from the technical idea of the present invention.

EXAMPLES

Example 1: Production of Gold Nanoparticle-Polymer Composite Thin Film (1) Production of Composite Thin Film in Reactor Triton X-100 (Sigma-Aldrich, USA) was added to [BMIM]BF4 (1-butyl-3-methylimidazolium tetrafluoroborate, Sigma-Aldrich) to a final concentration of 6.0 mol %, followed by stirring using a vortex mixer (KMC-1300V) for 15 minutes. 10 mg of $HAuCl_4 \cdot xH_2O$ (M.W.=339.79, Sigma-Aldrich) was added to 2.943 mL of the mixture solution, followed by sonication for 15 minutes.

0.5 ml of the prepared solution was placed in a Teflon reactor (70 mm×15 mm) and treated with plasma using an atmospheric-pressure plasma system (Ar, 150 W, 5 lpm) for 10 minutes. The distance between the plasma electrode and the liquid was 2 mm. After the plasma treatment, a film floating in the reactor was separated, washed sequentially with water and ethanol, and dried at 60° C. for 1 hour.

Figure 1:
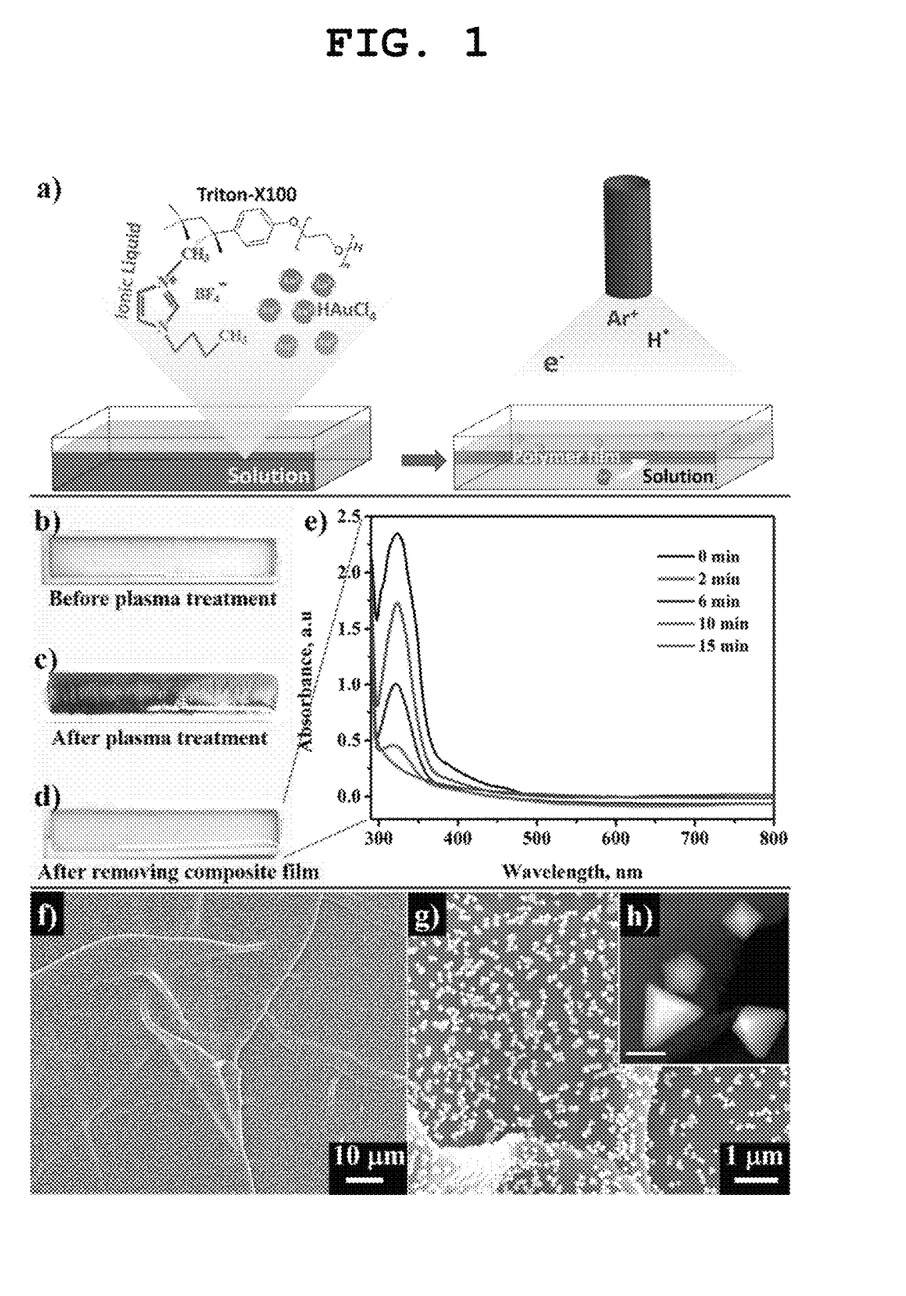
FIG. 1 depicts a schematic view of a reaction according to one embodiment of the present invention, photographs showing a process of performing the reaction, and an SEM image and TEM image of a thin film produced through the reaction.

FIG. 1a) is a schematic view of the above-described reaction, and FIGS. 1b) and 1d) are photographs of an actual reactor after the reaction. FIG. 1b) is a photograph of a reaction solution containing a gold nanoparticle precursor dissolved therein, before plasma irradiation, and the reaction solution showed yellow color due to $AuCl_4^-$. FIG. 1c) is a photograph after plasma treatment of the surface of the reaction solution, and shows a brown thin film formed at the interface of the reaction solution. FIG. 1d) shows the reaction solution remaining after separating the thin film from the reaction solution after plasma treatment, and as can be seen therein, the yellow color of the reaction solution was very light. Since the yellow color was attributable to the color of $AuCl_4^-$, it appears that the change in the color of the reaction solution reflects a change in the concentration of $AuCl_4^-$.

Accordingly, the change in the UV spectrum of the reaction solution with a change in the plasma treatment time was observed, and the results of the observation are shown in FIG. 1e). As shown therein, as the plasma treatment time increased, the absorbance at 323 nm due to the absorption of $AuCl_4^-$ decreased gradually, and after 15 minutes of plasma treatment, the peak at 323 nm completely disappeared, indicating that $AuCl_4^-$ was no longer present in the solution. In addition, the absorbance band at 550 nm which is the absorption wavelength of gold nanoparticles was also not present, suggesting that $AuCl_4^-$ was not reduced to gold nanoparticles in the solution. The above results suggest that $AuCl_4^-$ in the solution was not reduced to gold nanoparticles in the solution by plasma treatment, but was reduced after moved from the solution to the thin film formed at the interface and dispersed therein.

(2) Production of Composite Thin Film on Glass Substrate

Triton X-100 (Sigma-Aldrich, USA) was added to [BMIM]BF4 (1-butyl-3-methylimidazolium tetrafluoroborate, Sigma-Aldrich) to a final concentration of 1.5 mol %, followed by stirring using a vortex mixer (KMC-1300V) for 15 minutes. 10 mg of $HAuCl_4 \cdot xH_2O$ (Sigma-Aldrich) was added to the mixture solution, followed by sonication for 15 minutes.

0.5 ml of the prepared solution was dropped on a 20×20 mm glass substrate, and then treated with plasma using an atmospheric-pressure plasma system (Ar, 150 W, 5 lpm) for 10 minutes. The distance between the plasma electrode and the liquid thin film was 2 mm. The plasma-treated glass substrate was immersed in ethanol, and the thin film was separated from the glass substrate, washed sequentially with acetone and distilled water, and then dried at 60° C. for 1 hour.

Example 2: Structural Analysis of Gold Nanoparticle-Polymer Composite Thin Film The thin film produced in Example 1-(1) was imaged with low-magnification and high-magnification SEM (JSM-7000F, JEOL, Japan), and the images are shown in FIGS. 1*f*) and 1*g*). A TEM (JSM-7000F, JEOL, Japan) image of nanoparticles included in the thin film is shown in FIG. 1*h*). Wrinkles observed in FIG. if) were those formed in a process of transferring the thin film onto a silicon wafer for SEM image observation, and the SEM images of FIGS. 1*f*) and 1*g*) shows that particles having a uniform size were uniformly dispersed in the polymer thin film without being agglomerated. The scale bar in FIG. 1*h*) showing the TEM image indicates 100 nm, and suggests that Au nanoparticles had a particle size of about 100 nm and a clearly defined shape.

Figure 2:
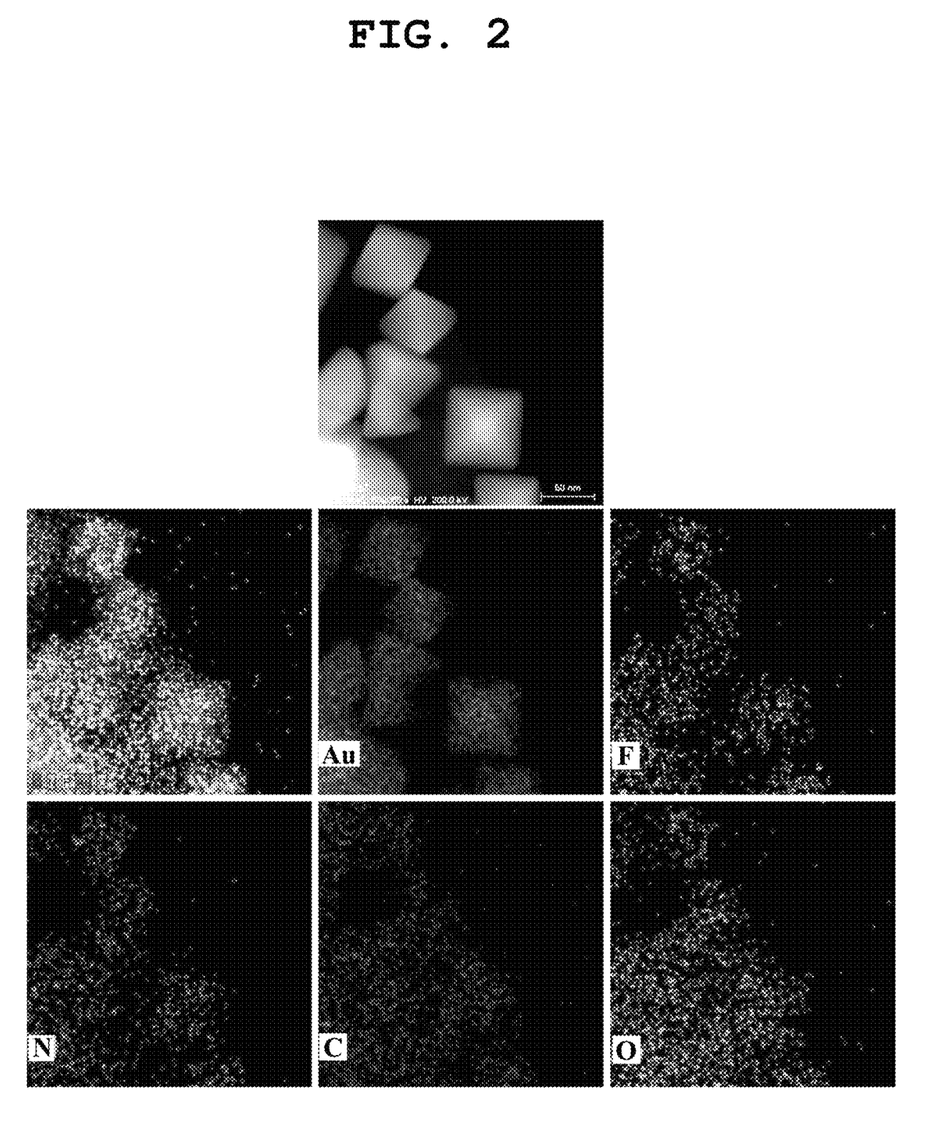
FIG. 2 shows STEM-EDS mapping images of a gold nanoparticle-polymer composite thin film produced by one example of the present invention.

The components of the produced thin film were analyzed by STEM-EDS (scanning transmission electron microscopy energy dispersive spectrometry). FIG. 2 depicts STEM-EDS mapping images, and shows that all elements, including Au, C, F, N and O, were uniformly dispersed. This indicates that the produced thin film is a gold nanoparticle-polymer composite thin film comprising gold nanoparticles dispersed in the polymer matrix.

Figure 3:
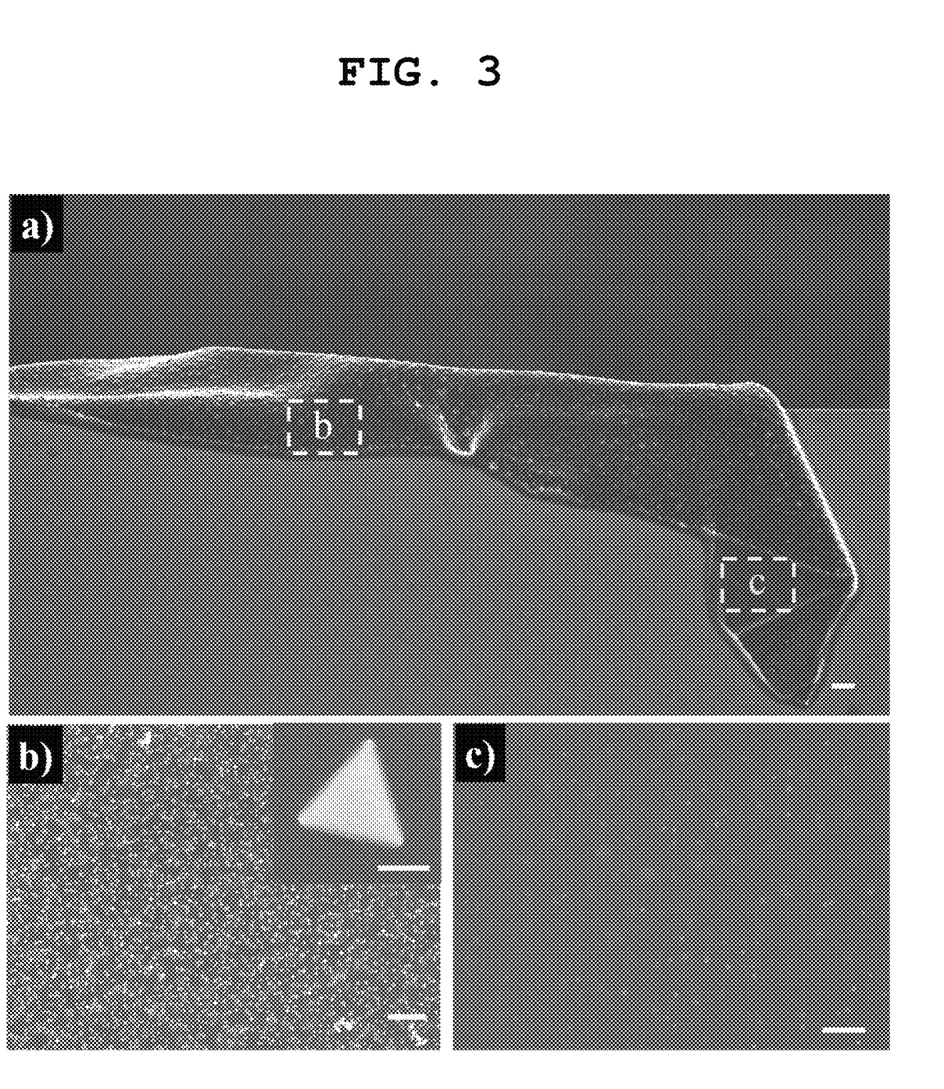
FIG. 3 shows SEM images of a gold nanoparticle-polymer composite thin film produced by one example of the present invention.

FIG. 3*a*) is an SEM image (scale bar: 10 μm) of the gold nanoparticle-polymer composite thin film transferred onto a silicon wafer, and FIGS. 3*b*) and 3*c*) are enlarged SEM images (scale bar: 1 μm) of the top surface and bottom surface, respectively, indicated in FIG. 1*a*). To produce the gold nanoparticle-polymer composite, $HAuCl_4 \cdot xH_2O$ was dissolved in [BMIM]BF$_4$ containing 3 mol % of Triton X-100 solution to a molar concentration of 10 mM, and then treated with plasma for 10 minutes according to the method of Example 1-(2), and the produced composite was separated. FIG. 3 shows that the concentration of gold nanoparticles differs between the top surface and the bottom surface. This suggests that the polymer thin film was first formed at the interface by the cross-linking reaction between Triton X-100 and the ionic liquid, and $AuCl_4^-$ from the solution was inserted into pores formed by the cross-linking reaction, and then grown into gold nanoparticles by plasma, and the polymer thin film was grown in the direction from the top surface to the bottom surface, thereby producing the gold nanoparticle-polymer composite thin film. Since the bottom surface of the thin film was in contact with the solution containing $AuCl_4^-$ dissolved therein, the size of the gold nanoparticles was as small as about 50 nm, and increased gradually toward the top surface, and was about 100 to 150 nm in the middle-height portion of the thin film.

Figure 4:
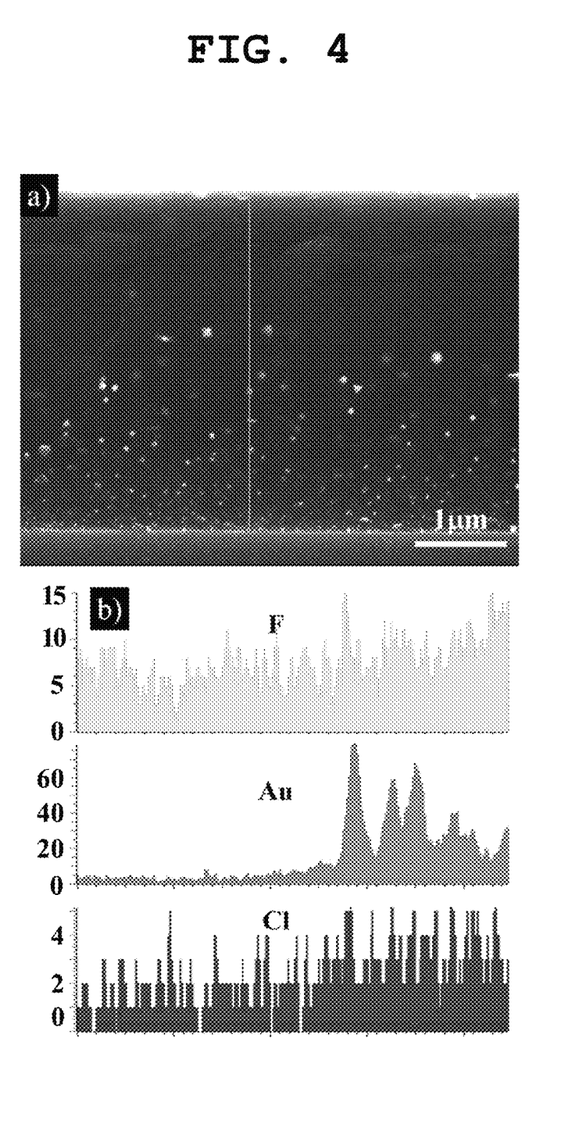
FIG. 4 depicts a sectional SEM image of a gold nanoparticle-polymer composite thin film produced by one example of the present invention and graphs showing STEM-EDS mapping of the thin film.

FIG. 4 depicts a SEM image of the section of the gold nanoparticle-polymer composite thin film and EDS mapping along the section, and shows the size and distribution of gold nanoparticles in the section of the composite thin film. In FIG. 4*b*), the left (0 μm) indicates the top surface, and the right indicates the bottom surface. From FIG. 4, it can be seen that the concentration of gold nanoparticles did differ along the section, but at the same thickness, the variation in the size of the gold nanoparticles was small and the gold nanoparticles were uniformly dispersed.

Figure 5:
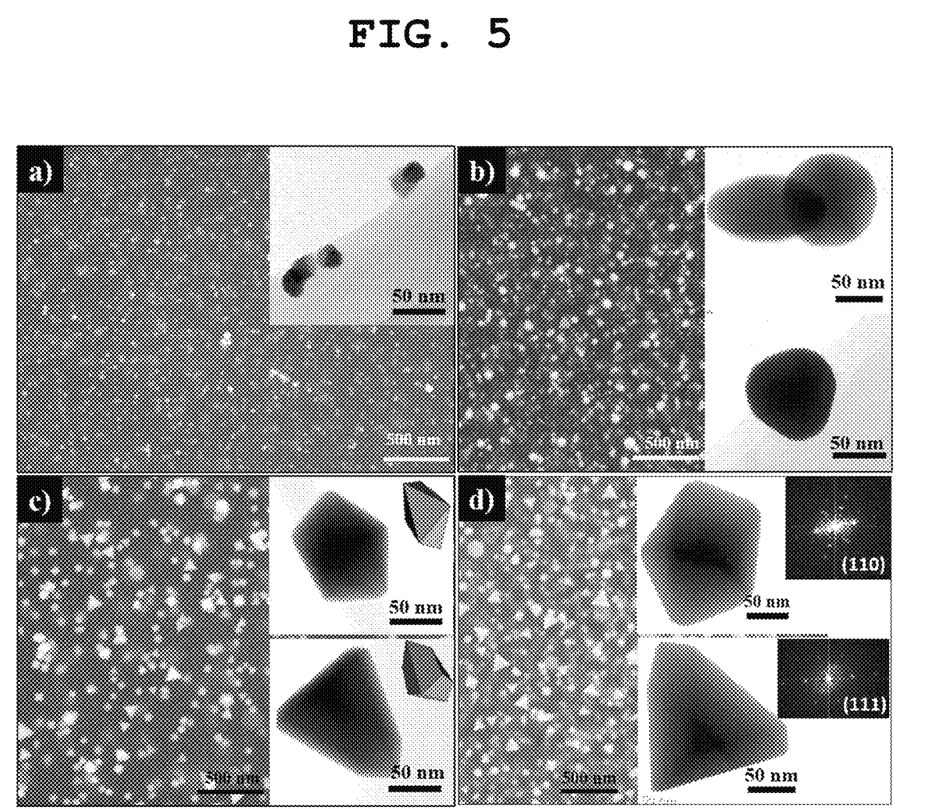
FIG. 5 depicts SEM images showing the growth of gold nanoparticles in a gold nanoparticle-polymer composite thin film for varying plasma treatment times.

Example 3: Analysis of Growth of Gold Nanoparticles for Varying Plasma Treatment Times In order to examine the process of growth of gold nanoparticles in a polymer matrix, gold nanoparticle-polymer composite thin films were produced while changing the plasma treatment time to 2 min, 6 min, 10 min and 15 min. The produced gold nanoparticle-polymer composite thin films were observed with SEM and TEM, and the results of the observation are sequentially shown in FIGS. 5*a*) to 5*d*). The content of Triton X-100 relative to [BMIM]BF$_4$ was 6 mol %, and the concentration of the gold nanoparticle precursor was 10 mM.

Figure 6:
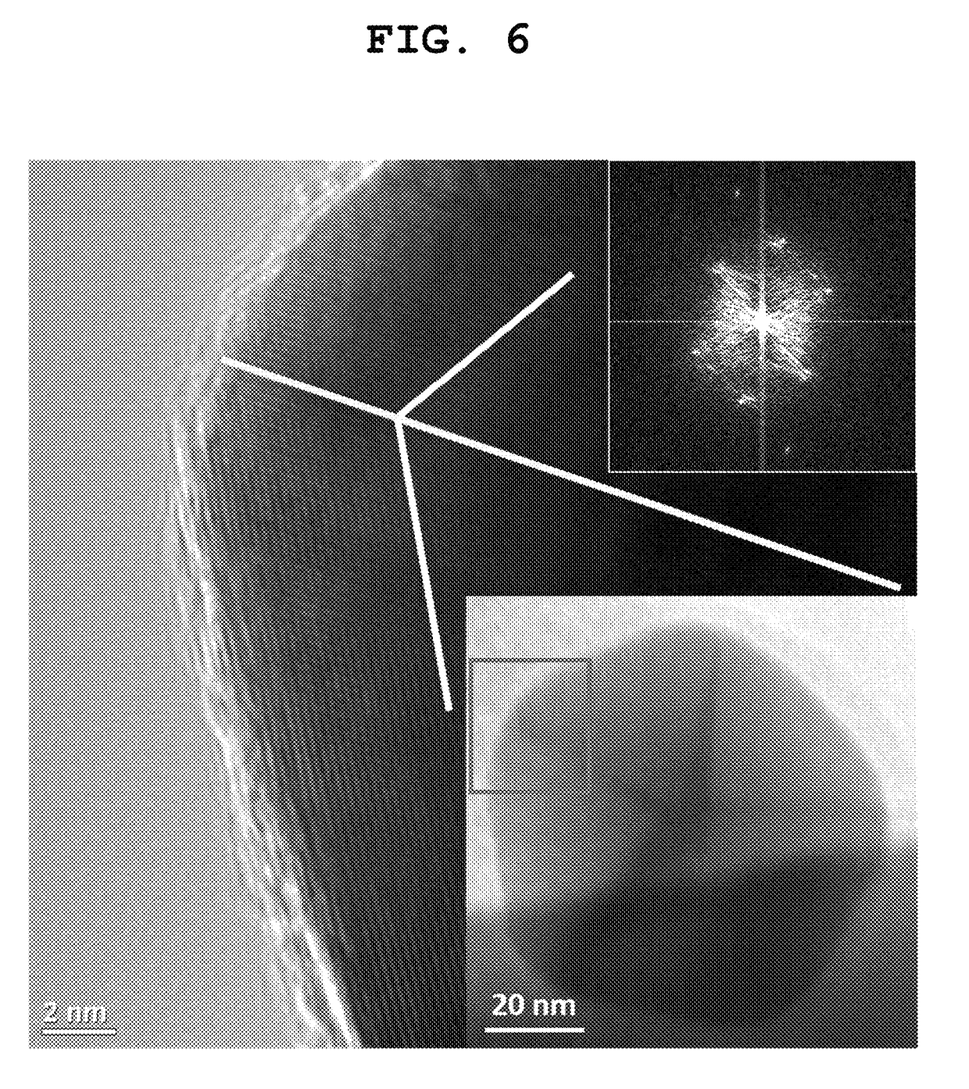
FIG. 6 shows a high-resolution TEM image and FFT (Thermo Scientific, USA) image of pentagonal bipyramidal gold nanoparticles in a gold nanoparticle-polymer composite thin film.

It was clearly observed that gold nanoparticles were formed after 2 minutes of plasma irradiation. It can be seen that the gold nanoparticles had an irregular shape and a size of about 20 nm and were single-twinned particles uniformly dispersed in the polymer thin film. When plasma was irradiated for 6 minutes, the size of the gold nanoparticles increased to about 60 nm, and the shape of the particles also greatly changed to polygonal bipyramidal particles, such as trigonal bipyramidal, tetragonal bipyramidal, pentagonal bipyramidal, and truncated trigonal bipyramidal particles. FIG. 6 shows a TEM image and FFT (Thermo Scientific, USA) image of a pentagonal bipyramidal nanoparticle, and shows that the pentagonal bipyramidal nanoparticle was a single crystal having a single twin plane indicated by the yellow line. It is known that a pentagonal bipyramidal nanoparticle consists of five tetrahedral crystals having the (111) plane and acts as the nucleus of nanocrystal growth of gold nanoparticles. When the plasma treatment time increased to 10 minutes, $AuCl_4^-$ moved from the solution to the polymer thin film and around the nucleus, and was then reduced slowly, thereby producing clearly defined nanoparticles having a uniform size of about 100 nm, such as octahedral, decahedral, dodecahedral, and truncated trigonal bipyramidal nanoparticles. As the gold nanoparticles grew, the concentration of $AuCl_4^-$ in the solution present under the gold nanoparticle-polymer composite thin film decreased gradually.

When the plasma treatment time further increased to 15 minutes, the gold nanoparticles grew to a size of about 150 nm and had a side with a sharp edge. Most of the nanoparticles were octahedral and truncated trigonal bipyramidal nanoparticles, which were face-centered cubic single crystals having (110) and (111) planes.

Regardless of the plasma treatment time, all the nanoparticles were uniformly dispersed in the polymer matrix without being agglomerated, and had a uniform particle size. Meanwhile, as the plasma treatment time became longer, the thickness of the thin film gradually became thicker.

Figure 7:
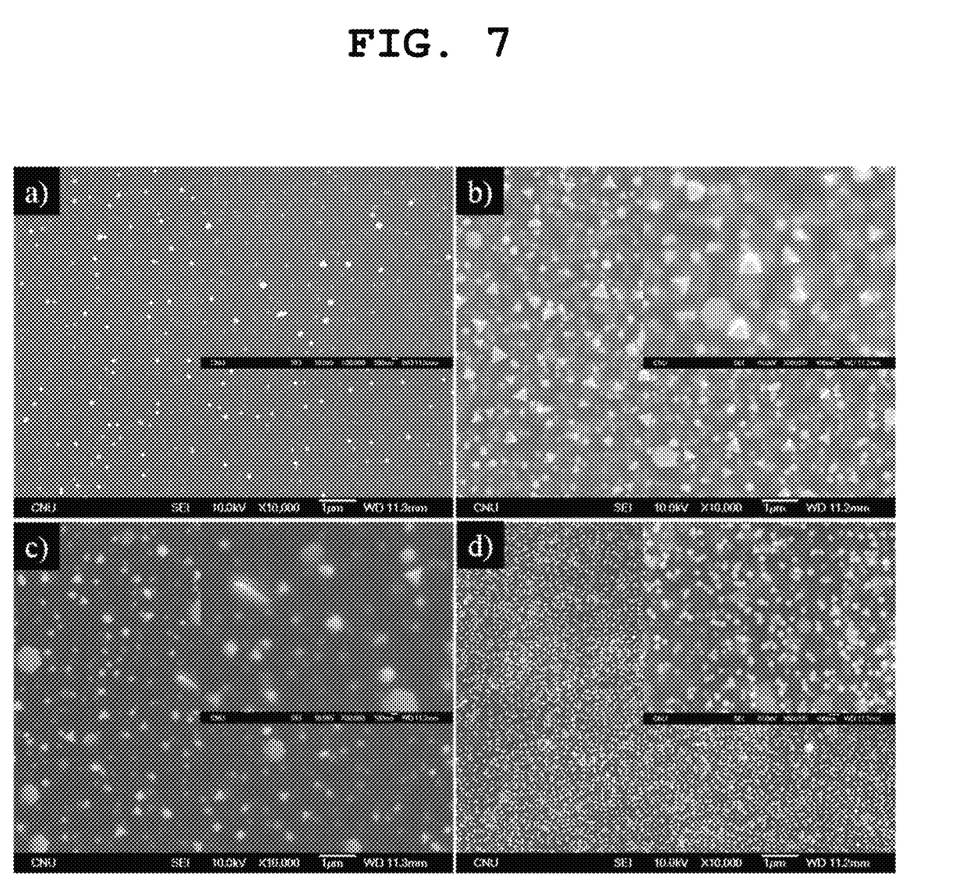
FIG. 7 depicts SEM images showing gold nanoparticle-polymer composite thin films formed using varying concentrations of a gold nanoparticle precursor in a solution.

Example 4: Analysis of Formation of Composites at Varying Concentrations of Gold Nanoparticle Precursor In order to analyze the effect of the concentration of the gold nanoparticle precursor in the solution on the formation of the composite thin film, gold nanoparticle-polymer composite thin films were produced by plasma treatment under conditions in which the concentrations of the gold nanoparticle precursor were 5, 10, 40 and 80 mM. The surfaces of the thin films were observed with a SEM, and the results of the observation are sequentially shown in FIGS. 7*a*) to 7*d*). The content of Triton X-100 relative to [BMIM]BF$_4$ was 6 mol %, and atmospheric pressure plasma treatment (Ar, 150 W, 5 lpm) was performed for 10 minutes.

As can be expected, as the concentration of the gold nanoparticle precursor in the solution increased, the concentrations of gold nanoparticles in the composite thin film also increased, and a gold nanoparticle-polymer composite thin film comprising gold nanoparticles uniformly dispersed therein without being agglomerated was formed.

Example 5: Analysis of Formation of Composites Using Varying Polymer Contents

Figure 8:
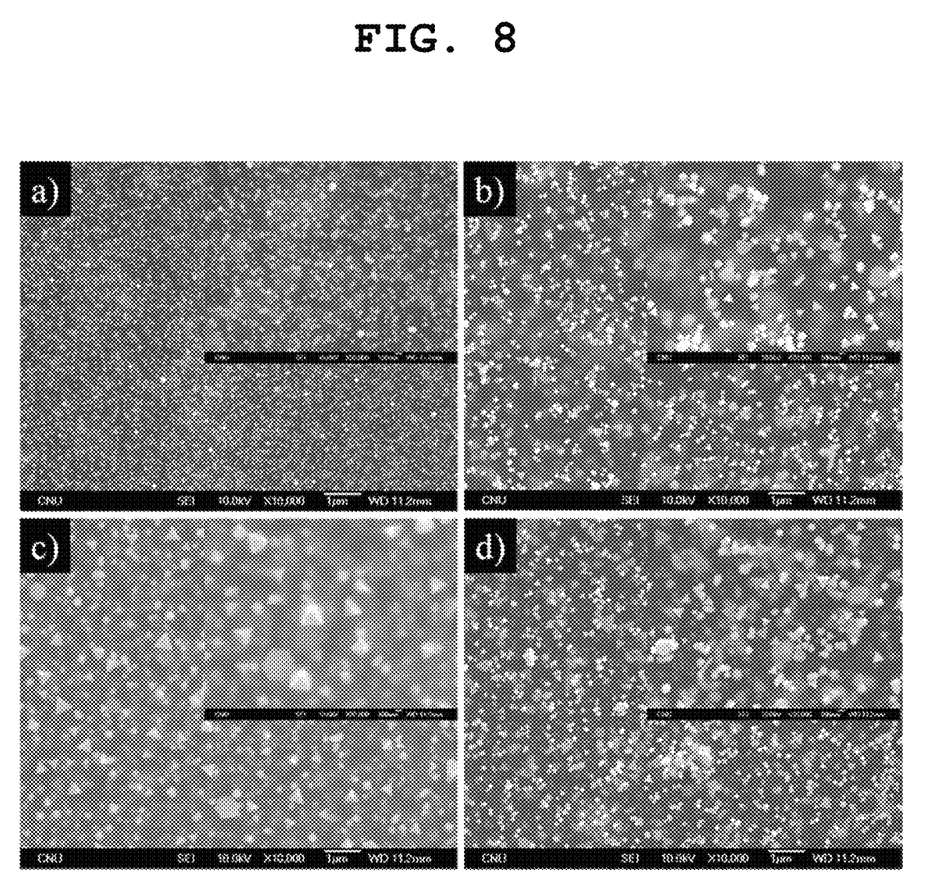
FIG. 8 depicts SEM images showing gold nanoparticle-polymer composite thin films formed using varying polymer contents.

In order to analyze the effect of the polymer content on the formation of the composite thin film, gold nanoparticle-polymer composite thin films were produced by plasma treatment under conditions in which the contents of Triton X-100 were 1.5, 3, 6 and 12 mol %. The surfaces of the thin films were observed with a SEM, and the results of the observation are sequentially shown in FIGS. 8a) to 8d). The concentration of the gold nanoparticle precursor was 10 mM, and atmospheric pressure plasma treatment (Ar, 150 W, 5 lpm) was performed for 10 minutes.

As the content of Triton X-100 increased, the thickness of the composite thin film formed decreased. When the content of Triton X-100 was 1.5 mol %, the thickness was the greatest. When the content of Triton X-100 was 1.5 mol %, the size of the gold nanoparticles was very small, and the crystal shape was also not clear. This is believed to be because when the content of Triton X-100 was low, the thickness of the polymer layer formed increased and the growth of the gold nanoparticles was also slow. As the content of Triton X-100 increased, the size of the particles formed increased, reached the greatest at 6 mol %, and then showed a tendency to decrease.

Figure 9:
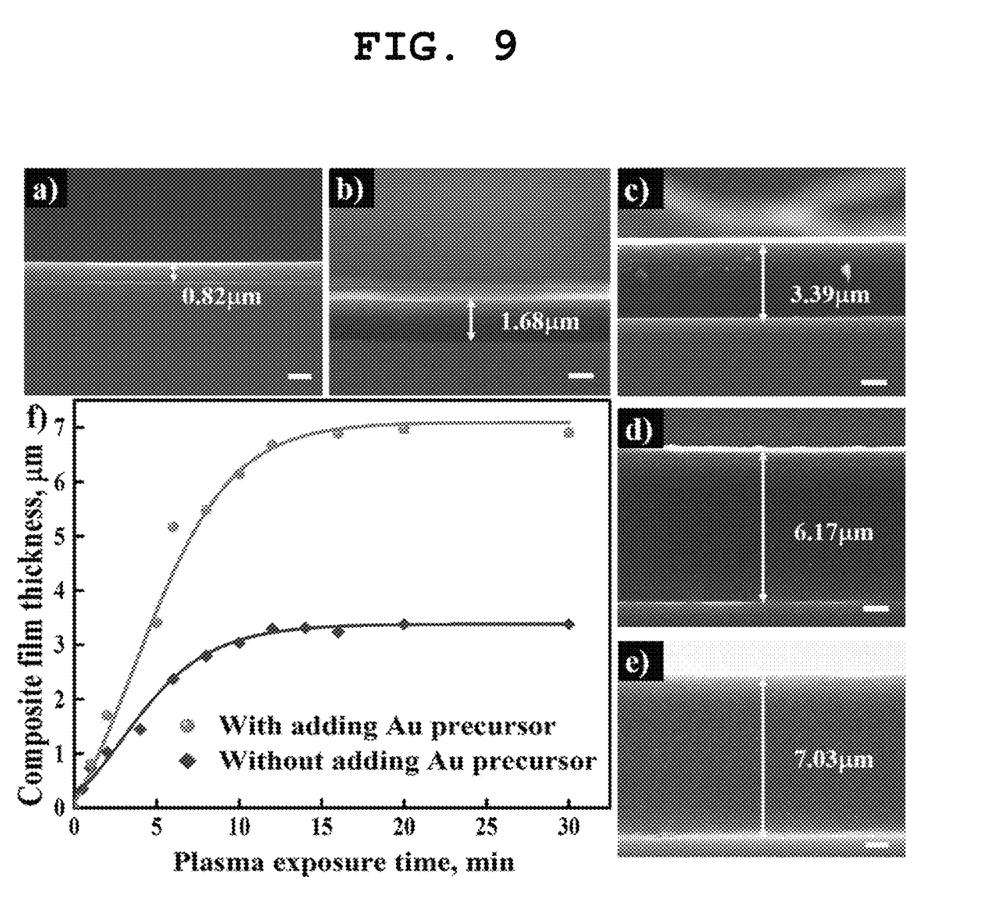
FIG. 9 depicts SEM section images and graphs showing the change in thickness of a gold nanoparticle-polymer composite thin film with a change in plasma treatment time.

Example 6: Evaluation of the Effect of Gold Nanoparticle Precursor on Thickness of Composite Thin Film In order to evaluate the effect of the gold nanoparticle precursor on the growth of the composite thin film, the thickness of the polymer thin film produced was compared between when the gold nanoparticle precursor was present (the concentration of the precursor in the solution was 10 mM) and when the gold nanoparticle precursor was not present. FIGS. 9a) to 9e) are SEM section images of composite thin films produced by 1 min, 2 min, 5 min, 10 min and 20 min of plasma treatment, respectively, and show that a thin film having a uniform thickness was formed by plasma treatment and as the plasma treatment time increased, the thickness increased gradually. FIG. 9f) is a graph showing the thickness of the produced thin film as a function of the plasma treatment time. In this figure, the red color indicates the thickness of the gold nanoparticle-polymer composite thin film produced with the addition of 10 mM of the gold nanoparticle precursor, and the blue color indicates the thickness of the polymer thin film produced without the addition of the gold nanoparticle precursor.

The thickness of the polymer thin film produced without the addition of the gold nanoparticle precursor was as thin as about ½ of the thickness of the composite thin film produced by plasma treatment for the same time. It could be seen that, regardless of the presence or absence of the gold nanoparticle precursor, as the plasma treatment time increased, the thickness of the thin film produced increased gradually, and then no longer increased after about 10 to 15 minutes.

The invention claimed is:

1. A method for producing a gold nanoparticle-polymer composite thin film, comprising the steps of:
   (A) preparing a mixture of an ionic liquid and a polyethylene oxide;
   (B) preparing a reaction solution by dissolving a gold nanoparticle precursor in the mixture;
   (C) producing a gold nanoparticle-polymer composite by applying plasma to an interface of the reaction solution; and
   (D) separating the gold nanoparticle-polymer composite from the reaction solution.

2. The method of claim 1, wherein the ionic liquid is a salt having a cation and an anion, the cation being substituted or unsubstituted 1-R-1-methylpyrrolidium or substituted or unsubstituted 1-R-3-methylimidazolium, wherein R is a C3 to C16 alkyl group, and the anion being $BF_4^-$, $F^-$, $Cl^-$, $Br^-$ or $I^-$.

3. The method of claim 1, wherein the polyethylene oxide is POE sorbitan fatty acid ester, POE alkyl phenyl ether, POE alkyl ether, or POE alkyl amine.

4. The method of claim 1, wherein a concentration of the gold nanoparticle precursor in the reaction solution is 0.01 to 1000 mM.

5. The method of claim 1, wherein the gold nanoparticle-polymer composite thin film has a thickness of 0.5 to 10 μm.

6. The method of claim 1, wherein the gold nanoparticle-polymer composite thin film has a concentration gradient present along a section of the thin film.

7. The method of claim 2, wherein a concentration of the gold nanoparticle precursor in the reaction solution is 0.01 to 1000 mM.

8. The method of claim 2, wherein the gold nanoparticle-polymer composite thin film has a thickness of 0.5 to 10 μm.

9. The method of claim 2, wherein the gold nanoparticle-polymer composite thin film has a concentration gradient present along a section of the thin film.

10. The method of claim 3, wherein a concentration of the gold nanoparticle precursor in the reaction solution is 0.01 to 1000 mM.

11. The method of claim 3, wherein the gold nanoparticle-polymer composite thin film has a thickness of 0.5 to 10 μm.

12. The method of claim 3, wherein the gold nanoparticle-polymer composite thin film has a concentration gradient present along a section of the thin film.

* * * * *